(12) United States Patent
Ververs et al.

(10) Patent No.: US 6,700,482 B2
(45) Date of Patent: Mar. 2, 2004

(54) ALERTING AND NOTIFICATION SYSTEM

(75) Inventors: Patricia M. Ververs, Brooklyn Park, MN (US); William H. Rogers, Eden Prairie, MN (US); Michael D. Good, Brooklyn Park, MN (US); Michael C. Dorneich, St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/967,577

(22) Filed: Sep. 28, 2001

(65) Prior Publication Data

US 2002/0039070 A1 Apr. 4, 2002

Related U.S. Application Data

(60) Provisional application No. 60/236,946, filed on Sep. 29, 2000.

(51) Int. Cl.[7] .............................................. G08B 23/00
(52) U.S. Cl. ...................... 340/500; 340/961; 340/945; 340/963; 340/968; 701/14
(58) Field of Search ................................. 340/945, 961, 340/963, 968, 964, 995.1–995.18; 701/301, 14

(56) References Cited

U.S. PATENT DOCUMENTS

| | | | |
|---|---|---|---|
| 4,433,323 A | 2/1984 | Grove | |
| 4,567,483 A | 1/1986 | Bateman et al. | |
| 4,646,244 A | 2/1987 | Bateman et al. | |
| 4,684,948 A | 8/1987 | Bateman | |
| 4,725,811 A | 2/1988 | Muller et al. | |
| 4,855,748 A | 8/1989 | Brandao et al. | |
| 4,891,642 A | 1/1990 | Muller | |
| 4,905,000 A | 2/1990 | Bateman | |
| 4,914,733 A | 4/1990 | Gralnick | |
| 4,947,164 A | 8/1990 | Bateman | |
| 5,008,844 A | 4/1991 | Kyriakos et al. | |
| 5,059,964 A | 10/1991 | Bateman | |
| 5,122,808 A | 6/1992 | Kyriakos | |
| 5,153,588 A | 10/1992 | Muller | |
| 5,187,478 A | 2/1993 | Grove | |
| 5,220,322 A | 6/1993 | Bateman et al. | |
| 5,272,725 A | 12/1993 | Jones et al. | |
| 6,002,347 A | 12/1999 | Daly et al. | |
| 6,021,374 A * | 2/2000 | Wood | 701/301 |
| 6,127,944 A * | 10/2000 | Daly et al. | 340/963 |
| 6,211,782 B1 * | 4/2001 | Sandelman et al. | 340/506 |
| 6,401,038 B2 * | 6/2002 | Gia | 701/301 |

OTHER PUBLICATIONS

Anderson, C.D. et al, Flight Status Monitor: Phase III, Final Report, *Flight Status Monitor Design Guidelines*, Boeing Report (1989).

(List continued on next page.)

Primary Examiner—Daryl Pope

(57) ABSTRACT

An alerting and/or notification system for operator(s) of a vehicle about conditions that affect the operation of the vehicle. The system collects information from one or more hazard warning systems, groups the warnings into different alert categories, and resolves conflicts between two or more hazard warnings within the same alert category to set a priority level. The prioritized alerts are presented to the operator, and associated detailed information also made available, in the form of graphical and/or textual messages on a display. Using two- or three-dimensional surround sound techniques, directional verbal and tonal aural cues also inform the operator(s) about the presence of threats and/or conditions. Visual displays and/or directional aural commands may be issued to dictate an evasive maneuver direction, if desired.

58 Claims, 5 Drawing Sheets

OTHER PUBLICATIONS

AvWeb (Sep. 20, 1999). *Investigation indicates LAPA 737 crew ignored cockpit warnings [On–line]*, 5(38), Available: http://www.avweb.com/newswise/news993B.html#3.

Boucek, G.P. et al, (1981). Aircraft alerting systems standardization study. *AIAA/IEEE Digital Avionics Systems Conference*, AIAA:New York, 119–128.

Bye, A., *An integrated alarm system—a concept study*. Halden Work Report 308, (Feb., 1992).

Cooperative Institute for Meteorological Satellite Studies (Jun. 2, 1999) University of Wisconsin—Madison [On–line]. Available: http://cimss.ssec.wisc.edu/goes/misc/990602.html.

Lindholm, T., "Cockpit access to strategic weather information", *Flight International '98*, pp 70–74. (1998).

Perrott, D.R. et al, "Aurally aided visual search in the central visual field: Effects of visual load anc visual enhancement of the target", *Human Factors*, 33(4), 389–400 (1991).

Pritchett, A.R., "Pilot situation awareness and alerting system commands", *Transactions of the Society of Automotive Engineers Annual Index/Abstracts of SAE Technical Papers*, Paper 981224. Warrendale, PA: Society for Automotive Engineers (1998).

Pritchett, A.R. et al (1998). *Pilot non–conformance to alerting system commands during closely space parallel approaches*. Cambridge, Massachusetts: MIT Aeronautical Systems Laboratory Technical Report (ASL–97–2).

Riley, V. et al, *Crew–Centered Flight Deck Alerting*, NASA Technical Report Contract No. NASI–20219. Hampton, VA: NASA Langley Research Center, (1999).

VanBruggen T.A.M. et al, *Signals and Alarm Philosophy: Literature Study*. Ergos Report B181–R2.alm. (May 1998).

Woods, D.D., The alarm problem and directed attention in dynamic fault management, *Ergonomics*, 38(11): 2371–2393 (1995).

Zweifel, T., "Optimal guidance during a windshear encounter", *Scientific Honeyweller*, pp110–116. (1989, Winter).

Hawkins, F.H., Display and Controls in H.W. Orlady (Ed.), *Human Factors in Flight* (2nd ed.), England Ashgate, (1993).

Honeywell Inc., Helping You Conrol Your World, *TCAS II Pilot's Handbook*, (Apr. 1995).

Honeywell International Inc., BENDIX/KING TCAS I Collision Avoidance System, *Pilot's Guide CAS 66A*, (May 1999).

* cited by examiner

ALERTING AND NOTIFICATION SYSTEM

This application claims priority under 35 U.S.C.§119(e)(1) to co-pending U.S. Provisional Patent Application Serial No. 60/236,946, filed Sep. 29, 2000, and entitled "Prioritization of Alerts For Conditions Outside an Aircraft".

FIELD OF THE INVENTION

The present invention relates generally to methods and devices for alerting the operator(s) of a vehicle about conditions effecting the operation of the vehicle.

BACKGROUND OF THE INVENTION

Over the past several years, a number of sophisticated flight hazard warning systems have been developed for aircraft which have contributed substantially to flight safety. These systems include ground proximity warning systems (GPWS), enhanced ground proximity warning systems (EGPWS), traffic alert and collision avoidance system (TCAS), and windshear detection systems.

The primary purpose of GPWS and EGPWS is to monitor an aircraft's position relative to terrain and prevent controlled flight into terrain (CFIT) accidents. With features such as look-ahead capability, verbal alerts, and terrain display on the aircraft's weather radar display or the electronic flight instrument system, the flight deck crew can gain situation awareness of the terrain in their immediate vicinity. Typically, a verbal alert, "Caution Terrain," will be first enunciated approximately 60 seconds from the collision point. This alert comes even earlier than a minute if the terrain is particularly high above the aircraft's altitude. If the flight deck crew does not change course and the aircraft gets within 30 seconds of the terrain (or obstacle) a second verbal alert, "TERRAIN, TERRAIN, PULL UP!" is issued.

For the most part, TCAS is designed to function as a backup to air traffic control and the see-and-avoid subjective method for traffic separation. Generally, the system is designed to examine the area in the vicinity of the aircraft, provide visual and aural advisories and alerts to the flight deck crew about traffic that impose a threat to safe and legal separation, and recommend the least disruptive vertical maneuver to achieve safe separation. The degree of threat imposed by the intruder is generally indicated through aural and visual cues with symbols that are redundantly color coded. In one commonly used system, a "traffic advisory" (TA) is displayed and the verbal alert "TRAFFIC—TRAFFIC" is issued when an intruder is within 20–48 seconds of the closest point of approach. If the separation distance decreases further and the intruder is determined to be within 15–35 seconds of a collision, a "resolution advisory" (RA) is displayed and the flight deck crew is aurally commanded to fly a vertical maneuver to prevent a collision. Typical aural commands related to a RA include "MONITOR VERTICAL SPEED," "CLIMB—CLIMB—CLIMB," "REDUCE DESCEND—REDUCE DESCEND," and "DESCEND, DESCEND NOW—DESCEND, DESCEND NOW".

Because in most cases these systems operate independently of each other, it is possible under certain circumstances to get conflicting warnings from more than one system at about the same time. For instance, there are situations in which a GPWS and EGPWS generates an aural "Pull Up" command followed immediately by the TCAS generating a "Descend" command. This type of situation can make it very difficult for the flight deck crew to make a timely determination of the correct response, especially considering the limited time available for responding to a given warning.

Several techniques have been proposed for addressing this problem. In one such approach, each flight hazard warning system generates both an inhibit signal and a warning alert signal, and the system is configured such that the inhibit signal from one selected hazard warning system is used to suppress alert signals from all other hazard warning systems. Since there are a very large number of potential flight hazards, each with varying criticality and associated probability of an accident, such a simplistic approach will be unlikely to provide optimal warnings of flight hazards.

Another disadvantage of current flight hazard warning systems is that they include several physically separate, independent, and discrete systems such as the GPWS, EGPWS, TCAS, a reactive windshear system (ReWS), and a predictive windshear system (PrWS). U.S. Pat. No. 6,002,347 (Daly et. al.) and U.S. Pat. No. 6,127,944 (Daly et. al.), both assigned to the assignee of this invention and hereby incorporated by reference, list some drawbacks of a federated approach, and propose methods to overcome such shortcomings. Both '347 and '944 provide an aircraft flight hazard avoidance system wherein concurrently generated warning signals are prioritized to provide a warning of the most critical flight hazard.

While the teachings of both '347 and '944 are useful for de-conflicting and resolving concurrently issued conflicting alerts originating from more than one hazard warning system, they do not appear to discuss methods for presenting the output of their system to the flight deck crew.

SUMMARY OF THE INVENTION

Since the flight deck crew needs to be aware of a significant number of events in the environment outside the aircraft, it is generally desirable to integrate and prioritize the incoming information into like categories, and present the information in a less confusing and de-conflicted manner.

The present invention provides methods and systems for filtering, integrating, and/or presenting information to the flight deck crew, preferably within a common framework. In one illustrative embodiment, flight hazard conditions detected by conventional systems including TCAS, GPWS, EGPWS, PrWS, ReWS, weather radar, etc., are analyzed and prioritized to resolve any conflicting warnings. Then, aural and/or visual presentation methods are used to aid the flight deck crew in circumventing the conditions. In one illustrative embodiment, two- or three-dimensional surround-sound techniques are used to emanate directional aural cues from strategic locations on the flight deck to aid in drawing the crew's attention to one or more alerts. Alternatively, or in addition, some or all of the alerts may be presented graphically and/or textually on one or more visual displays on the flight deck.

DETAILED DESCRIPTION OF THE INVENTION

The following detailed description should be read with reference to the drawings, in which like elements in different drawings are numbered in like fashion. The drawings depict selected embodiments and are not intended to limit the scope of the invention. In some cases, the drawings may be highly diagrammatic in nature. Those skilled in the art will recognize many of the examples provided have suitable alternatives which may be utilized. Although the invention is described in the context of airborne vehicles, it can also be applied in any application where situation awareness and knowledge is desirable, such as in automobiles and trucks, armored vehicles, ships and boats, etc. The terms "flight deck crew", "crew", and "operator" are used synonymously in the following description of the invention.

Figure 1:
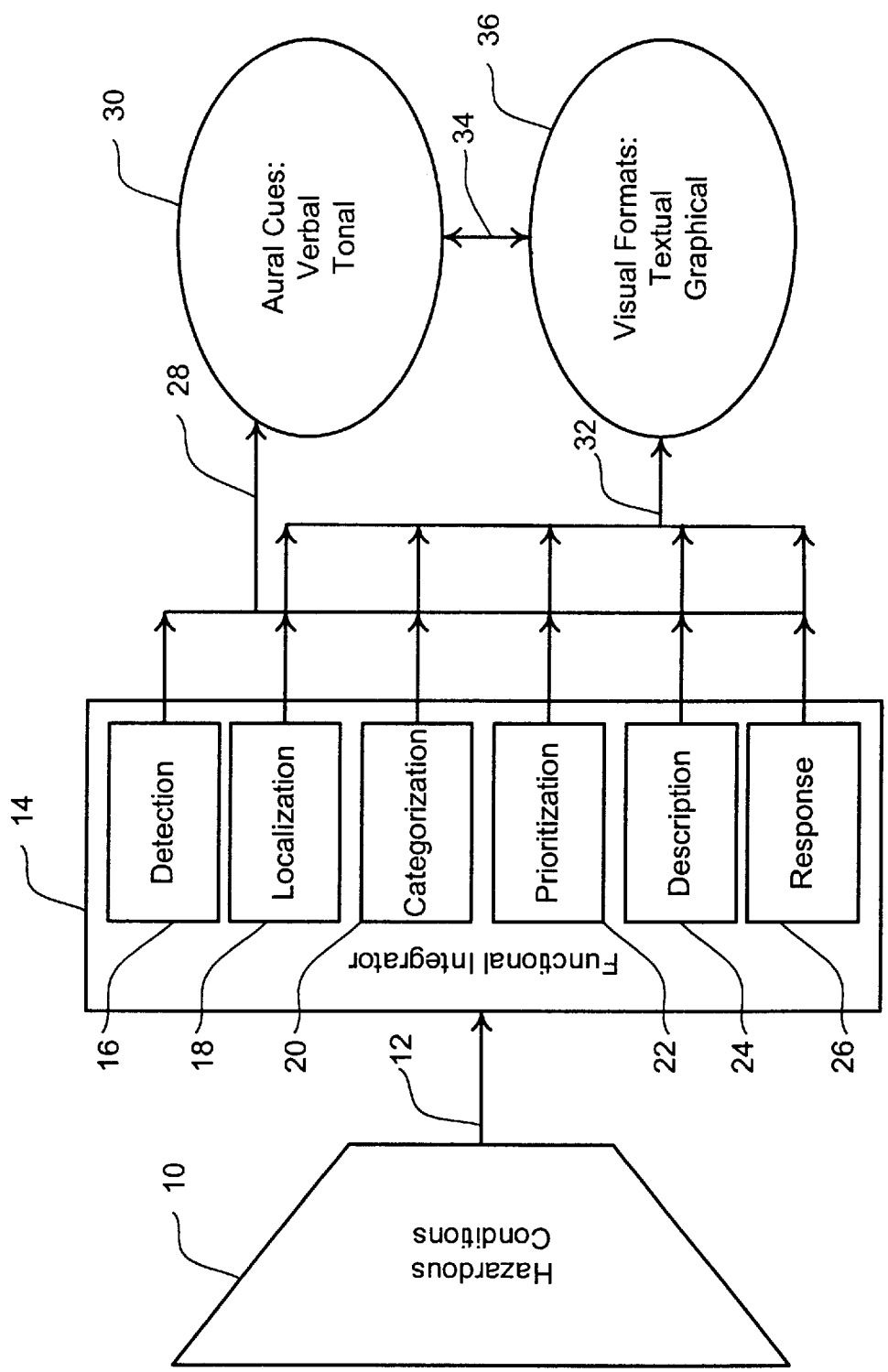
FIG. 1 is a block diagram showing an illustrative alerting system in accordance with the present invention.

FIG. 1 shows the functional blocks of an alerting system of an illustrative embodiment of the present invention. Hazardous conditions 10 external to the vehicle may be sensed by conventional systems, such as GPWS, EGPWS, TCAS, PrWS, ReWS, etc., and relayed along path 12 to functional integrator 14 of the alerting system. Since the various flight hazard warning systems are well known in the avionics industry, they will not be described herein. Descriptions of suitable GPWS and EGPWS are provided in U.S. Pat. Nos. 4,567,483, 5,220,322, 4,433,323, 5,187,478, 4,684,948 and 4,646,244 and in patent application Ser. Nos. 08/509,660 and 08/509,702, all of which are hereby incorporated by reference. Suitable TCAS and associated hardware are described in U.S. Pat. Nos. 5,122,808, 5,272,725, 4,914,733, 5,008,844 and 4,855,748 and in published documents: "Pilot's Guide TCAS II CAS 67A/81A Bendix/King Traffic Alert and Collision Avoidance Systems" and "Pilot's Guide CAS 66A Bendix/King TCAS I Collision Avoidance Systems", all of which are hereby incorporated by reference. Suitable PrWS and ReWS systems are described in U.S. Pat. Nos. 4,905,000, 5,059,964, 4,725,811, 4,947,164, 5,153,588 and 4,891,642, all of which are hereby incorporated by reference.

Functional integrator 14 receives on path 12 signals representing the presence of hazardous conditions 10 and records the information in detection block 16. Since the external environment is spatial wherein events may occur at different points in space relative to the vehicle, it is preferable for the operator to know, as precisely as possible, the location of hazardous conditions 10 because it could directly impact the operator's decisions. Localization block 18 performs this task of identifying the absolute and/or relative location of hazardous conditions 10. Information regarding hazardous conditions 10 received by functional integrator 14 are then preferably analyzed and categorized into groups of like conditions in block 20, and prioritized according to severity in block 22. The categorization function in block 20 will be discussed later when describing FIG. 2, and the prioritization function of block 22 will be discussed in connection with FIGS. 2 and 3. Description block 24 of functional integrator 14 may be used to assist the operator in understanding the nature of hazardous conditions 10, determining the possible course of action, and the amount of time available for reacting to the conditions. In certain situations, especially when the flight deck crew may be under time pressure to act quickly and most likely may not have sufficient amount of time to think about what task to perform, it may be desirable to provide information about the most appropriate action to execute. Commands to the operator are determined by response block 26 of functional integrator 14.

To increase the effectiveness of an alerting system, hazardous conditions 10 are preferably and appropriately detected 16, localized 18, categorized 20, and prioritized 22 prior to presenting any descriptive information 24 and before issuing commands 26 to the operator. As depicted in FIG. 1, both aural and visual indicators, 30 and 36 respectively, may be used for providing this functionality in the illustrative embodiment of the present invention. This information may range from spoken and visually displayed words indicative of the external conditions such as traffic and/or terrain in the vicinity of the vehicle and/or commands for one or more maneuvers, to fairly detailed combination of graphics and textual descriptions of a weather cell over the destination airport, for example.

Research indicates that the ability of an operator to detect a signal can be substantially improved if an aural warning is presented versus situations in which an aural warning is absent (Perrott, et al, 1991). Additionally, and in some embodiments, the auditory system may be thought of as a "360° sensory system", i.e., by using two- or three-dimensional surround sound, information about the environment could be processed independent of the direction of the operator's gaze. Both the intensity of the sound and its location in space, i.e., the location on the flight deck from where it emanates, can play a significant role in the crew's ability to detect and react. Since the external environment is a spatial one in which events can occur at different locations in space, the illustrative embodiment may provide location information to an operator through the use of directional sound. With directional sound, the natural orienting mechanism of the human auditory system can be exploited to provide an abundance of information about the surroundings, e.g., a beep or buzzer alarm on the flight deck may be presented from a specific location relative to the operator of the vehicle, say from a direction or apparent direction indicative of the location of an approaching vehicle. In this scenario, the flight deck crew could be immediately alerted to the presence of the external threat without establishing visual contact, and a command could be issued from, for example, the desired direction for an evasive maneuver. It has been postulated that the operator would make the evasive maneuver in a shorter period of time than if the threat had to be first localized via visualization on a display or the like. In addition, the presentation of spatial auditory warnings, especially those presented simultaneously with other aural information and/or commands, may be enhanced since each warning may be presented from a different spatial location that is meaningful to the flight deck crew.

To this end, and as shown in FIG. 1, the illustrative embodiment includes broadcasting aural cues block 30, which broadcasts aural cues from strategic locations on the flight deck to aid in directing the crew's attention, and in response to signals transmitted along path 28 from functional integrator 14. The illustrative embodiment may also include visual formats block 36, which visually displays textual messages and/or graphical information to the operator. This data is provided along path 32 by functional integrator 14. Additionally, one or more aural cues could correspond to one or more visual displays, or vice versa. For example, to circumvent a threat condition, an aural command to descend may apparently emanate from the floor of the flight deck and a corresponding textual message and/or downward pointing arrow could be displayed on a display unit. This coordination between aural device 30 and visual device 36 is illustrated by link 34.

In an illustrative embodiment, aural and/or visual information during various states of an evasive maneuver may include the direction and/or speed of the threat such as another vehicle, terrain, weather, etc., direction for an evasive maneuver including yaw, pitch, and roll, and/or rates of change thereof, final altitude and compass orientation at the end of the maneuver, thrust/power settings for the one or more engines, etc.

Figure 2:
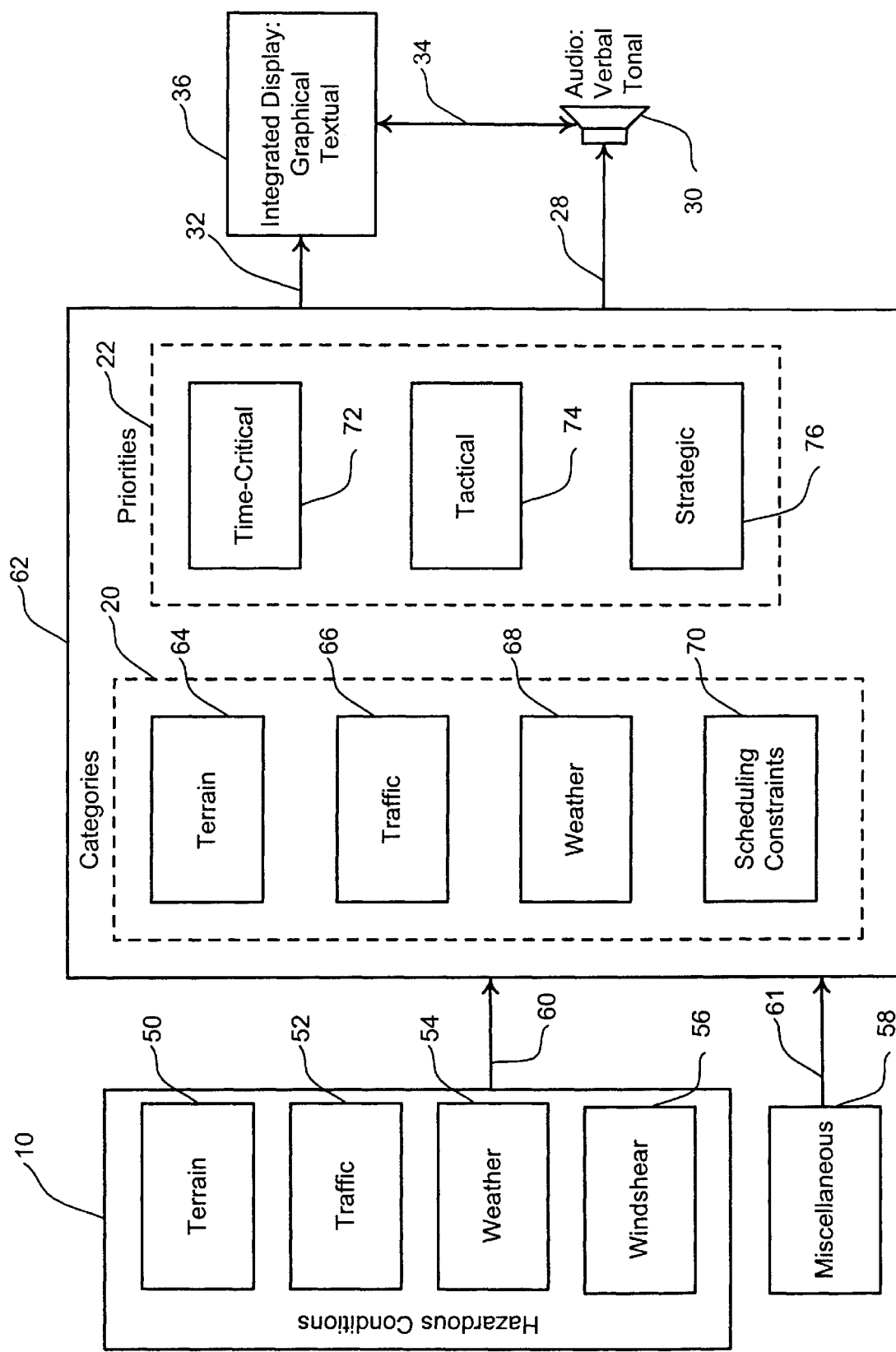
FIG. 2 is a block diagram of an illustrative filter for categorizing and/or prioritizing information before it is presented to the flight deck crew.

An illustrative filter for categorizing and/or prioritizing information before it is presented to the flight deck crew is shown in the block diagram of FIG. 2. In the illustrative embodiment, hazardous conditions 10 are detected through systems such as GPWS or EGPWS for terrain 50, TCAS for traffic 52, weather radar for weather 54, and ReWS and PrWS for windshear 56. Information on hazardous conditions 10 and miscellaneous data 58 such as information from air traffic control, airliner dispatch, notices to airmen (NoTAM), etc., are respectively input along paths 60 and 61 to the filtering system 62, where they are grouped into categories 20 of like items. Categories 20 includes data groups of like items such as terrain 64, traffic 66, weather and weather-related conditions 68, and scheduling constraints 70 such as assigned runway, approach path to airport and runway, assigned gate, taxi path from runway to gate, etc., in addition to the aforementioned miscellaneous data from block 58.

Next, as described below in reference to FIG. 3, the conditions within each category 64, 66, 68, and 70 are prioritized in block 22 into alerts designated as time-critical 72, tactical 74, and strategic 76. In the illustrative embodiment, unique aural cues 30 and/or applicable visual representations on display 36 are used to assist the operator in differentiating between groups 64, 66, 68, and 70 of categories 20, and between the alert priorities 72, 74, and 76.

Figure 3:
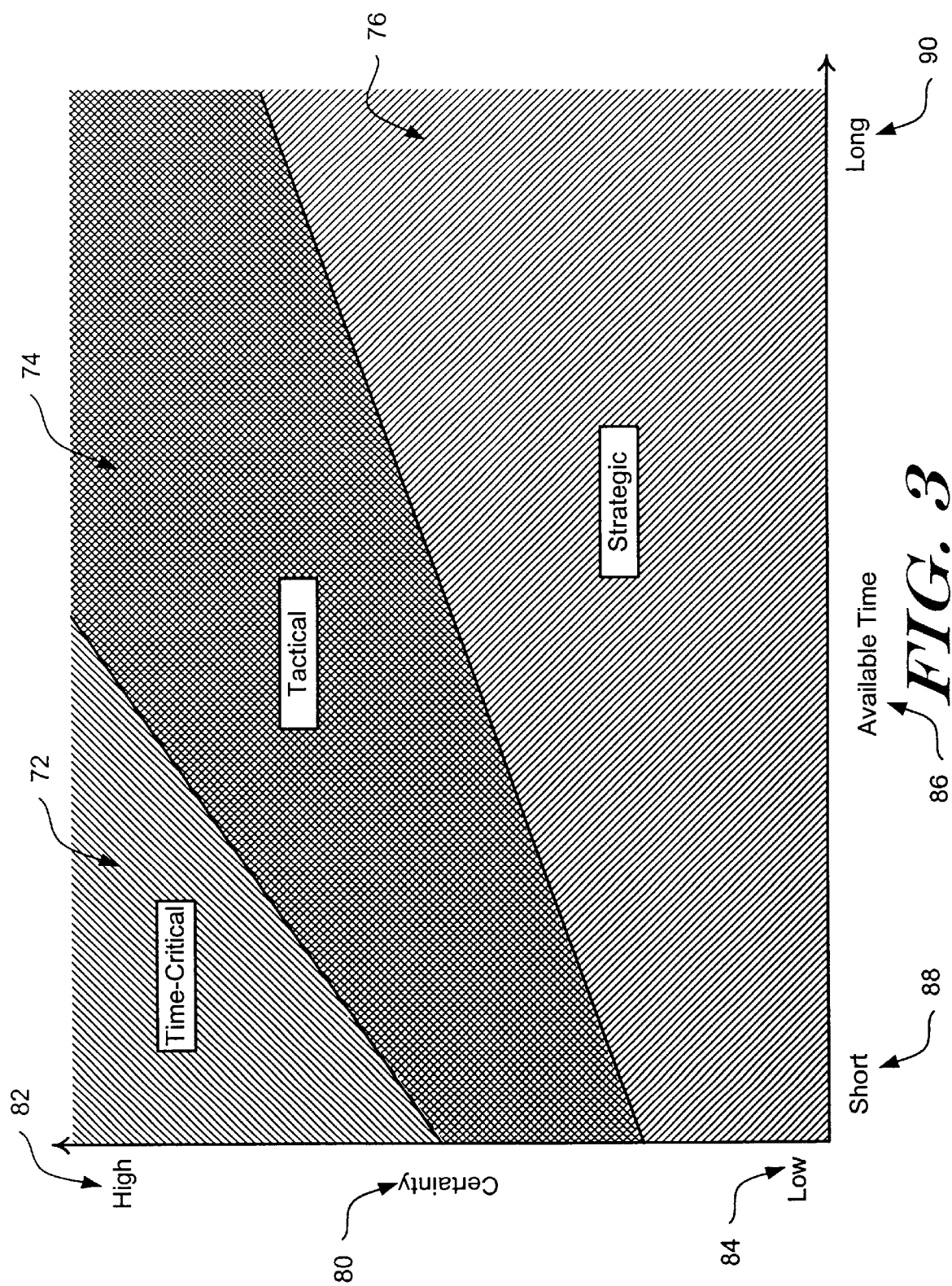
FIG. 3 is a graphical representation of an alert prioritization scheme.

One method for prioritizing alerts is graphically represented in FIG. 3. Each hazardous condition 10 within each category is analyzed for its degree of certainty 80 of occurrence and the available time 86 for a response to circumvent the condition. The degree of certainty 80 of actually encountering the condition ranges from low 84 to high 82, and the available time 86 ranges from short 88 to long 90.

In the illustrative embodiment, time-critical alerts 72 are classified as those threats that may occur with a relatively higher degree of certainty 82 within a relatively short duration of time 88 and require the immediate attention and response of the flight deck crew. In one embodiment, time-critical alerts 72 are defined as threats that are most likely to be encountered within a 60-second time window. When a time-critical alert 72 is identified, the operator is preferably presented with correlated aural cues and visual alerts to quickly direct attention to the nature and location of the threat, and may also issue one or more commands for circumventing the threat. Examples of time-critical alerts 72 are imminent collision with another vehicle or terrain.

In the illustrative embodiment, tactical alerts 74 are designated as those conditions that may require the operator's attention in the immediate or near future, i.e., conditions having a slightly longer time window for response than time-critical alerts 72. In one embodiment, tactical alerts 74 are defined as conditions that may affect the mission within 10 minutes, such as weather in the immediate vicinity. One or more repeating non-verbal aural cues along with corresponding visual displays detailing the nature of the alert may be used to inform the flight deck crew about these threats. In an alternative embodiment, conditions with a definitively higher level of certainty, approaching 100% for example, but more than 10 minutes in the future, are also designated as tactical alerts. For instance, advance knowledge of the unavailability of a specific runway and/or closure of the destination airport necessitating a diversion to an alternate site, may be identified as a tactical alert, for example.

Strategic alerts 76 are classified in the illustrative embodiment as those conditions that may be less certain due to the dynamism of an ever changing environment. In one embodiment, strategic alerts 76 are defined as those conditions that may affect the mission more than 10 minutes in the future, such as weather over a distant destination airport, pilot reports of conditions along the flight plan, traffic congestion at the destination, etc. While such strategic information 76 may be useful in providing overall situation awareness and for the purposes of planning and making informed decisions, the associated notification system may operate in a manner that will not overload the operator with information and/or interrupt current tasks. For example, subtle and yet informative aural cues and/or visual displays may be used such that the flight deck crew may decide whether or not to address the situation then, or at a latter time, depending on their current workload.

From the foregoing discussions, and because systems such as GPWS, EGPWS, TCAS, etc., operate independently of each other, it is likely that under some circumstances, one or more conflicting time-critical 72 and/or tactical 74 alerts may be generated at or about the same time. U.S. Pat. Nos. 6,002,347 and 6,127,944 propose methods to overcome such shortcomings by providing an aircraft flight hazard avoidance system wherein concurrently generated time-critical 72 and/or tactical 74 alerts that are de-conflicted and further prioritized to provide one or more warnings of the most critical flight hazards. The illustrative embodiment of the present invention preferably includes the de-conflicting methods disclosed in '347 and '944 to resolve such issues prior to aurally and/or visually notifying the operator.

Figure 4:
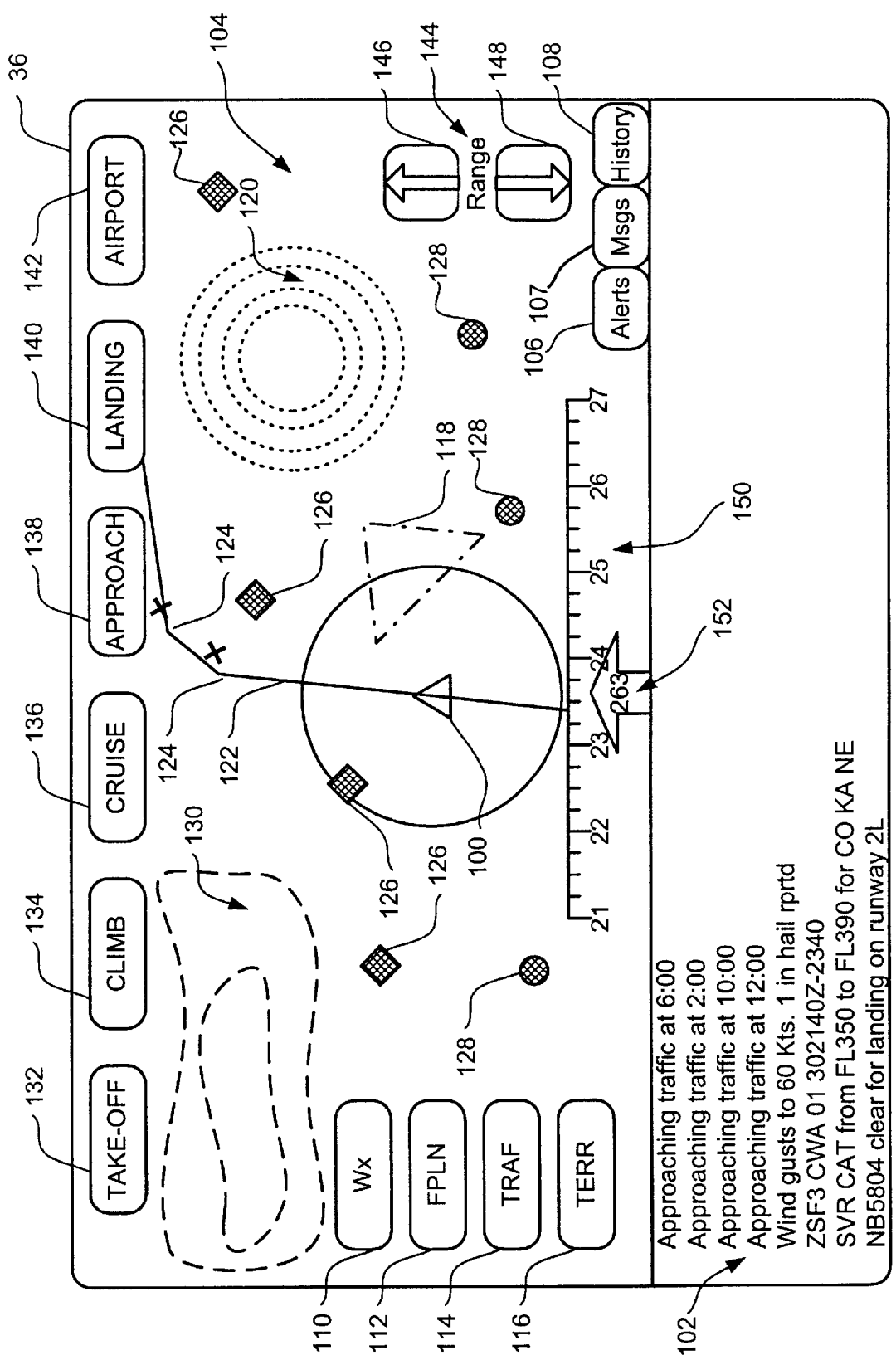
FIG. 4 shows an illustrative display in accordance with the present invention.

Once hazardous conditions 10 and miscellaneous data 58 have been grouped into categories 20 and undergone prioritization 22, the information is relayed to the flight deck crew by aural cues 30 and/or shown on a display 36. FIG. 4 is one illustrative example of display 36 on which time-critical, tactical, and strategic messages may be shown to the operator. As will become evident from the following discussion, display 36 may also be useful as a situation awareness, planning, and collaborative decision making tool by permitting the crew to view different phases of the vehicle's journey and overlaying information from a plurality of sources to gain a better understanding of current and/or future external environments. In the illustrative embodiment, display 36 includes of two areas, viz., textual message area 102, and graphical display area 104.

Textual message area 102 is preferably used for displaying the prioritized time-critical, tactical, and strategic alerts, 72, 74, and 76, respectively. Textual message area 102 includes three illustrative views represented by tabs labeled "Alerts" 106, "Msgs" 107 (for "Messages), and "History" 108. Alerts 106, consisting of time-critical alerts 72 and tactical alerts 74, are displayed by default. The "Msgs" tab 107 may be selected to display messages related to strategic alerts 76. The "History" tab 108 may be selected to display all issued alerts, including the time, priority level, etc.

In the illustrative embodiment, time-critical alerts 72 appear at the top of the textual message area 102, followed by tactical alerts 74 and then strategic messages 76. To aid in distinguishing between the different types of alerts, each type of alert may be displayed in a different color. In one embodiment of the invention, time-critical alerts 72 are displayed in red, tactical alerts 74 are displayed in amber, and strategic alerts 76 are displayed in cyan for the most recent messages and in white for older messages. Also, time-critical alerts 72 are preferably listed in order of criticality (from high to low), i.e., if the most recently received time-critical alert 72 is identified as being less critical than an earlier time-critical alert 72, then the earlier time-critical alert 72 is retained at the top of the list of time-critical alerts 72. In one embodiment of the invention, a time-critical alert 72 ranking from high to low may be ReWS, PrWS, terrain, traffic, and convective weather. In the illustrative embodiment, tactical and strategic alerts 74 and 76, respectively, are listed in order of entry into the system.

Textual message area 102 is preferably scrollable and may include detailed descriptions of the alerts or messages. Certain messages may have a designated graphics link such that, when that message is selected, an associated graphic is displayed in graphical display area 104. For example, selecting a weather related message in textual message area 102 may display the output from a weather radar for the location to which the message pertains. Typical messages expected to be displayed in textual message area 102 include alerts of threatening traffic, terrain, and weather conditions, NoTAMs, pilot reports (PiReps), relevant ATIS reports, etc.

Time-critical, tactical, and strategic alerts (72, 74 and 76, respectively) can also be graphically depicted in graphical display area 104. In the illustrative embodiment, the graphical display area 104 may provide the operator the ability to select and/or de-select one or more items to be displayed, such as weather 110, flight plan 112, traffic 114, and terrain 116. Information related to these selections may be either displayed alone or in combination. This feature provides the ability to view flight plan 112 with one or more hazards overlaying flight path 122. Unique color-coding and texturing of the information can be used to overlay multiple alerts. Time-critical alerts 72 preferably cannot be covered up by time-critical alerts 72 having a lower criticality, and also cannot be covered up by either tactical and/or strategic alerts 74 and 76, respectively. As previously discussed, in one embodiment of the invention, a time-critical alert 72 ranking from high to low may be ReWS, PrWS, terrain, traffic, and convective weather. Under this choice of ranking, since wind shear is the highest level time-critical alert, no other alert can be superimposed on top of it, however, any other alert with lower criticality may be displayed transparently such that the higher criticality alerts may not be totally obscured by the lower criticality alerts.

As shown in FIG. 4, several pieces of information related to weather 110, flight plan 112, traffic 114, and terrain 116, can be presented in graphical display area 104. For instance, within weather 110, convective weather may be displayed by default, however, additional options may allow the presentation of icing, turbulence 118, windshear, storms 120, etc. Alternatively, or in addition, time lapse data showing weather in motion may be displayed permitting the flight deck crew to view weather trends. By selecting flight plan 112, the operator may view the flight path 122, waypoints 124, airports, special use airspace, runway approaches, etc. Forward traffic 126 and aft traffic 128 in the general vicinity of vehicle 100 may also be displayed using traffic 114. Alternatively, or in addition, time lapse data showing traffic flow and/or traffic congestion in areas along flight path 122 and/or in the vicinity of the destination airport may also be viewed on graphical display area 104. Terrain option 116 may help the flight deck crew to display top-down two-dimensional view 130 of the terrain or a rotating three-dimensional perspective display. Alternatively, or in addition, absolute terrain features may be displayed regardless of the vehicle's current altitude or presented relative to the current altitude, as desired.

In the illustrative embodiment, the graphical display area 104 may provide the operator the ability to select and/or de-select one or more items to be displayed, such as takeoff 132, climb 134, cruise 136, approach 138, landing 140, and airport 142. Information related to any multiple consecutive items of this group can either be displayed alone or in combination. For instance, the vehicle's climb, cruise, and approach phases may be viewed together on the same display screen. Airport diagrams including runways, taxiways, terminals, gates, etc., may be viewed by selecting the label airport 142. In one embodiment, the airport diagrams may be displayed in the North-up position. An alternate embodiment might include the ability to manually or automatically rotate or control the airport diagram relative to the vehicle and orienteering it in the direction of the assigned runway to correspond with track-up position for final approach. The vehicle's designated taxiway to the assigned gate may also be indicated on the airport map, if desired.

In the illustrative embodiment, two formats are provided for viewing information in graphical display area 104, viz., an egocentric format and an exocentric format, although other formats may be used. The default view is egocentric, wherein the information is presented in relation to the vehicle's current position 100, including its heading 152, along flight path 122. The egocentric format is preferably maintained until the flight deck crew selects the exocentric world-referenced view to "look ahead" of the vehicle's current position. Options for viewing weather 110, flight plan 112, traffic 114, and terrain 116, either singulary or in combination, are preferably maintained so as to provide situation awareness. The "look ahead distance" may be displayed as range 144 which may be either increased 146 or decreased 148 by the operator, as desired.

Figure 5:
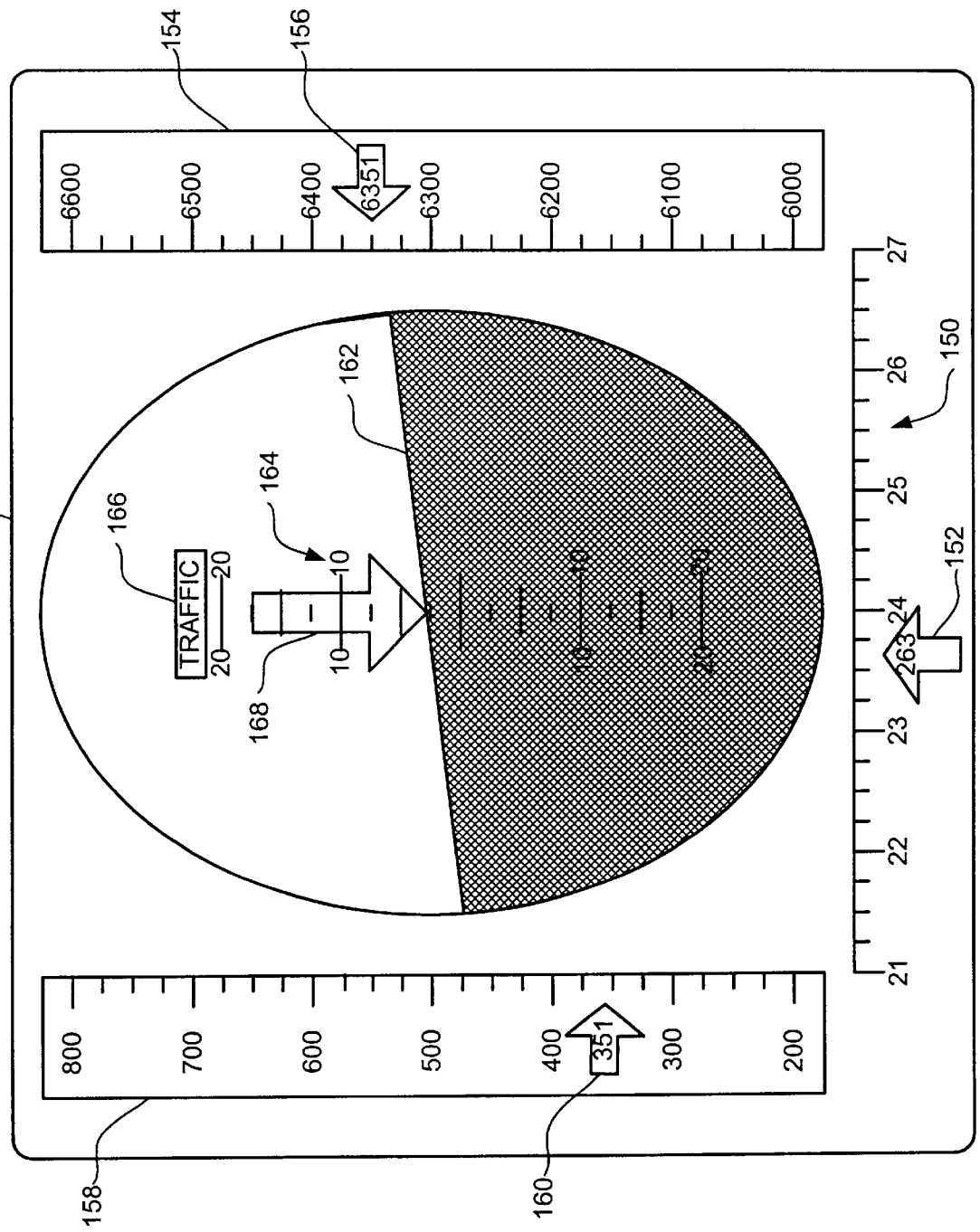
FIG. 5 shows another illustrative display in accordance with the present invention.

In one embodiment, the present invention may supplement the primary flight display (PFD) typically used by the flight deck crew. To obviate distracting the operator's attention from the PFD during one or more flight critical conditions, the attitude direction indicator (ADI) portion of the PFD is modified by the alerting and notification system of the present invention. In the illustrative embodiment, only the aforementioned time-critical alerts 72, viz., ReWS, PrWS, terrain, traffic, and convective weather, are displayed on the ADI along with an indication of the suggested maneuver to circumvent the condition triggering the alert. FIG. 5 is one illustrative view of an ADI 200 as modified by the illustrative embodiment of the present invention in response to a time-critical alert. A typical ADI 200 may include a slideable directional scale 150 including a vehicle direction indicator 152 displaying the actual compass orientation of the flight path, a slideable altitude scale 154 including a vehicle altitude indicator 156 displaying the actual height above sea level, a slideable speed scale 158 including a vehicle speed indicator 160 displaying the actual velocity, and artificial horizon 162 with vehicle attitude (or pitch) indicator 164.

Under normal conditions, i.e., in the absence of any time-critical alerts, ADI 200 may not display any extra information in addition to that described above. However, when a time-critical alert, for example nearby traffic, is detected, an alerting message 166 may be prominently displayed on ADI 200, and the direction 168 for a suggested resolution maneuver may also be prominently displayed on ADI 200. Alerting message 166 and direction 168 for resolution maneuver are preferably retained on ADI 200 until the time-critical alert dissipates. In an illustrative embodiment, aural and/or visual information during various states of an evasive maneuver may include the direction and/or speed of the threat such as another vehicle, terrain, weather, etc., direction for an evasive maneuver including yaw, pitch, and roll, and/or rates of change thereof, final altitude and compass orientation at the end of the maneuver, thrust/power settings for the one or more engines, etc.

As previously discussed, yet another feature complementing display 36 of the illustrative embodiment is the use of two- or three-dimensional surround sound directional aural cues that, in some embodiment, are correlated with visual indications, such as color coded icons, on display 36 and/or ADI 200. As such, directional aural cues may help to orient the operator's attention not only towards the threat but also towards a safe location. For instance, in the presence of a time-critical alert, a verbal alert message may emanate from the apparent direction of where, relative to the flight deck, the one or more threat is located, and/or another verbal command may be issued from the apparent direction in which the vehicle should be moved to avoid the threat. For tactical alerts, verbal and/or tonal aural cues emanating from the direction of display 36 could be used to attract the crew's attention towards display 36 where detailed information may be presented. Strategic alerts may be indicated by non-intrusive tonal aural cues, for example.

The following examples of a time-critical alert and a tactical alert are provided to help in better understanding the illustrative embodiment. These examples are only meant to be illustrative, and numerous other variations are contemplated.

Imagine that a second aircraft is rapidly approaching a first aircraft. The alerting and notification system of the present invention may recognize this as a time-critical situation and verbally issues a "CAUTION TRAFFIC" message to the flight deck crew of the first aircraft from an apparent direction corresponding to the location of the second aircraft. Additionally, the second aircraft may be indicated graphically and/or textually on display 36 of the first aircraft. If the flight deck crew of the first and/or second aircraft do not heed to their respective warnings and take no action to resolve the situation, the directional verbal message on the first aircraft may change to "TRAFFIC, TRAFFIC" and emanate from the apparent direction corresponding to the location of the second aircraft. Additionally, ADI 200 may indicate the presence of traffic 166 as shown in FIG. 5. Furthermore, there may be additional graphic and/or directional verbal messages commanding the flight deck crew of the first aircraft on an appropriate action to execute for resolving the threat. For instance, if the resolution for the first aircraft is to reduce altitude to evade the approaching second aircraft, a downward pointing arrow 168 (see FIG. 5) indicating a descend movement may be displayed on ADI 200, and/or a verbal command from the flight deck floor may command the crew to "DESCEND, DESCEND NOW—DESCEND, DESCEND NOW". Preferably, the directional aural cues continue emanating, and the graphics on display 36 and ADI 200 continue showing the second aircraft and the maneuver direction until the threat has been resolved. Digital signal processing techniques or the like may be utilized to enhance the perceived urgency and the apparent distance of the threat by changing the pitch, rate, tone, etc. of the verbal messages.

As an example of a tactical alert, imagine that an aircraft is on final approach to an airport. Assume that during descent, the system senses that the aircraft may intercept a convective weather cell less than 10 minutes ahead. A tonal aural alert may emanate from the direction of display 36 and the alert causing condition may be presented on display 36 informing the flight deck crew of the weather alert. The visual information on display 36 may provide the operator(s) details about the nature of the weather cell with the text message of the alert displayed in amber in the textual messaging area 102 (see FIG. 4) and a graphical representation of the area affected by the weather cell displayed in the graphic display area 104.

Having thus described the illustrative embodiment of the present invention, those of skill in the art will readily appreciate that yet other embodiments may be made and used within the scope of the claims hereto attached. Numerous advantages of the invention covered by this document have been set forth in the foregoing description. It should be understood, however, that this disclosure is, in many respects, only illustrative. Changes may be made in details, particularly in matters of shape, size, and arrangement of parts without exceeding the scope of the invention. Although the invention is described in the context of airborne vehicles, it can also be applied in any application where situational awareness and knowledge is desirable, such as in automobiles and trucks, armored vehicles, ships and boats, etc. The invention's scope is, of course, defined in the language in which the appended claims are expressed.

We claim:

1. A method for alerting an operator of a vehicle about one or more conditions, said method comprising the steps of:
   receiving one or more messages, wherein the one or more messages include information regarding the locations of the one or more conditions relative to the vehicle; and
   providing aural indications to the operator from a direction or apparent direction that is dependent on the locations of the one or more conditions relative to the vehicle.

2. A method for suggesting a course change to an operator of a vehicle in response to one or more external conditions, said method comprising the steps of:
   receiving one or more messages, wherein the one or more messages include information regarding the locations of the one or more external conditions relative to the vehicle; and
   providing an aural indication to the operator from a direction or apparent direction for a new course for the vehicle to circumvent the one or more external conditions.

3. A method for alerting an operator of a vehicle about one or more conditions, said method comprising the steps of:
   receiving one or more time-critical messages, each including information regarding the locations of the one or more conditions relative to the vehicle; and
   providing aural indications to the operator for the one or more time-critical messages wherein the aural indications appear to originate from directions corresponding to such locations.

4. A method according to claim 3 wherein the one or more time-critical messages include information regarding the locations of the one or more conditions relative to the vehicle, and the aural indications are verbal alerts emanating from a direction or apparent direction that is dependent on the locations of the one or more conditions relative to the vehicle.

5. A method according to claim 3 wherein the one or more time-critical messages include information regarding locations of one or more external conditions relative to the vehicle, and the aural indications are verbal commands emanating from a direction or apparent direction for a new course for the vehicle to circumvent the one or more external conditions.

6. A method according to claim 3 wherein the one or more time-critical messages are for the one or more conditions requiring immediate attention and/or action by the operator of the vehicle.

7. A method for alerting an operator of a vehicle about one or more conditions, said method comprising the steps of:
  receiving one or more tactical messages, each including information regarding the one or more conditions; and
  providing aural indications to the operator for the one or more tactical messages.

8. A method according to claim 7 wherein the one or more tactical messages include information regarding the locations of the one or more conditions relative to the vehicle, and the aural indications are tone alerts emanating from a direction or apparent direction that is dependent on the locations of the one or more condition relative to the vehicle.

9. A method for alerting an operator of a vehicle about one or more conditions, said method comprising the steps of:
  receiving one or more strategic messages, each including information regarding the locations of the one or more conditions; and
  providing aural indications to the operator for the one or more strategic messages wherein the aural indications appear to originate from directions corresponding to such locations.

10. A method for alerting an operator of a vehicle about one or more external conditions, said method comprising the steps of:
  receiving one or more messages, each including information regarding the locations of the one or more external conditions relative to the vehicle; and
  providing aural indications to the operator for the one or more messages, the aural indications being of a tone and/or sound level indicative of the distance of the one or more external condition from the vehicle wherein the aural indications appear to originate from directions corresponding to such locations.

11. A method for alerting an operator of a vehicle about one or more external conditions, said method comprising the steps of:
  receiving one or more messages, each including information regarding the one or more external conditions relative to the vehicle; and
  providing aural indications to the operator for the one or more messages, the aural indications being of a tone and/or sound level indicative of a sense of urgency for responding to the one or more messages and being perceivable as originating from a direction corresponding to the location of the one or more external conditions.

12. A method for alerting an operator of a vehicle about one or more conditions, said method comprising the steps of:
  receiving one or more messages, wherein the one or more messages include information regarding the locations of the one or more conditions relative to the vehicle;
  providing one or more visual indicators to the operator, the one or more visual indicators indicative of the locations of the one or more condition relative to the vehicle; and
  providing aural indications to the operator for the one or more messages, the aural indications being of a tone and/or sound level indicative of a sense of urgency for responding to the one or more messages.

13. A method for suggesting a course change to an operator of a vehicle in response to one or more external conditions, said method comprising the steps of:
  receiving one or more messages wherein the one or more messages include information regarding the locations of the one or more external conditions relative to the vehicle; and
  providing a visual indicator to the operator, the visual indicator providing directions for an evasive maneuver for the vehicle to circumvent the one or more external condition.

14. A method for alerting an operator of a vehicle about one or more conditions, the vehicle having one or more displays and/or control inputs, said method comprising the steps of:
  receiving one or more messages wherein the one or more messages include information regarding the one or more conditions; and
  providing aural indications of the one or more conditions to the operator from a direction or apparent direction that is dependent on the location of the one or more conditions relative to the vehicle and corresponding to the one or more displays and/or control inputs.

15. A method for suggesting a course change to an operator of a vehicle in response to one or more external conditions, the vehicle having one or more displays and/or control inputs, said method comprising the steps of:
  receiving one or more messages, wherein the one or more messages include information regarding the location of the one or more external conditions relative to the vehicle; and
  providing an aural indication to the operator from a direction or apparent direction for a new course for the vehicle to circumvent the one or more external conditions and corresponding to the one or more displays and/or control inputs.

16. A method for graphically displaying one or more alerts to an operator of a vehicle, each alert relating to one or more conditions, said method comprising the steps of:
  receiving the one or more alerts; and
  displaying higher priority alerts on top of lower priority alerts.

17. A method according to claim 16 wherein at least the selected lower priority alerts are opaque to the overlapping higher priority alerts.

18. A method according to claim 16 wherein a plurality of icons are used for differentiating between different priorities or levels of the one or more alerts.

19. A method according to claim 16 wherein a plurality of colors are used for differentiating between different priorities or levels of the one or more alerts.

20. A method for alerting an operator of a first vehicle about one or more conditions external to the first vehicle, said one or more conditions including information about other vehicles in the vicinity of the first vehicle, the method comprising:
  providing aural indications to the operator, the aural indications perceivable as originating from a direction corresponding to the location of the one or more conditions.

21. A method for alerting an operator of a vehicle about one or more conditions external to the vehicle, said one or more conditions including information about terrain in the vicinity of the vehicle, the method comprising:

provide aural indications to the operator, the aural indications perceivable as originating from a direction corresponding to the location of the terrain.

22. A method for alerting an operator of a vehicle about one or more conditions external to the vehicle, said one or more conditions including information about windshear in the vicinity of the vehicle, the method comprising:

providing aural indications to the operator, the aural indications perceivable as originating from a direction corresponding to the location of the windshear.

23. A method for alerting an operator of a vehicle about one or more conditions external to the vehicle, said one or more conditions including information about weather in the vicinity of the vehicle's path, the method comprising:

providing aural indications to the operator, the aural indications perceivable as originating from a direction corresponding to the location of the weather.

24. A method for alerting an operator of a vehicle about one or more conditions external to the vehicle, said one or more conditions including information about weather in the vicinity of the vehicle's destination, the method comprising:

providing aural indications to the operator, the aural indications perceivable as originating from a direction corresponding to the location of weather.

25. A method for informing an operator of a vehicle about one or more conditions, said method comprising the steps of:

receiving one or more messages, each including information regarding the one or more conditions;

displaying the information on one or more displays, each display comprising a textual messaging area and a graphical display area, and providing aural indications to the operator, the aural indications perceivable as originating from a direction corresponding to the location of the one or more conditions.

26. A method according to claim 25 wherein the one or more displays comprise a plurality of textual views selectable by the operator.

27. A method according to claim 25 wherein the one or more displays comprise a plurality of graphical views selectable by the operator.

28. A method according to claim 25 wherein the one or more messages are displayed in priority order.

29. A method according to claim 25 wherein the textual messaging area is scrollable by the operator.

30. A display according to claim 25 wherein messages in the textual messaging area can be selected by the operator for viewing an associated graphic in the graphical display area.

31. A method according to claim 25 wherein information regarding the one or more conditions are displayed overlapping each other.

32. A method according to claim 31 wherein the displayed information includes the vehicle's path.

33. A method according to claim 31 wherein the displayed information includes the weather in the vicinity of the vehicle's path.

34. A method according to claim 31 wherein the displayed information includes the weather in the vicinity of the vehicle's destination.

35. A method according to claim 31 wherein the displayed information includes the terrain in the vicinity of the vehicle.

36. A method according to claim 31 wherein the displayed information includes information about other objects in the vicinity of the vehicle.

37. A method for informing an operator of a vehicle about weather conditions, the vehicle having one or more displays each display comprising a textual messaging area and a graphical display area, said method comprising the steps of:

receiving and storing information about weather conditions; and displaying the weather conditions on the one or more displays; and providing aural indications to the operator, the aural indications perceivable as originating from a direction corresponding to the location of the weather conditions.

38. A method according to claim 37 further comprising means for displaying historic or time-lapse images of weather pattern in the vicinity of the vehicle's path.

39. A method according to claim 37 further comprising means for displaying time-lapse images of predicted weather pattern in the vicinity of the vehicle's path.

40. A method according to claim 37 further comprising means for displaying historic or time-lapse images of weather pattern in the vicinity of the vehicle's destination.

41. A method according to claim 37 further comprising means for displaying time-lapse images of predicted weather pattern in the vicinity of the vehicle's destination.

42. A system for alerting an operator of a vehicle about one or more conditions, said system comprising:

means for receiving one or more messages, wherein the one or more messages include information regarding the location of the one or more conditions relative to the vehicle; and means for providing aural indications to the operator from a direction or apparent direction that is dependent on the location of the one or more conditions relative to the vehicle.

43. A system for suggesting a course change to an operator of a vehicle in response to one or more external conditions, said system comprising:

means for receiving one or more messages, wherein the one or more messages include information regarding the location of the one or more external conditions relative to the vehicle; and means for providing an aural indication to the operator from a direction or apparent direction for a new course for the vehicle to circumvent the one or more external conditions.

44. A system for alerting an operator of a vehicle about one or more conditions, said system comprising:

means for receiving one or more messages, wherein the one or more messages include information regarding the location of the one or more conditions relative to the vehicle; and means for providing visual indicators to the operator, the visual indicators indicative of the location of the one or more conditions relative to the vehicle and wherein such visual indicators describe a direction for an evasive maneuver to avoid the one or more conditions.

45. A system for suggesting a course change to an operator of a vehicle in response to one or more external conditions, said system comprising:

means for receiving one or more messages, wherein the one or more messages include information regarding the location of the one or more external conditions relative to the vehicle; and means for providing a visual indicator to the operator, the visual indicator describing a new course for the vehicle to circumvent the one or more external conditions.

46. A system for alerting an operator of a vehicle about one or more conditions, the vehicle having one or more displays and/or control inputs, said system comprising:

means for receiving one or, more messages, wherein the one or more messages includes information regarding the one or more conditions; and means for providing aural indications of the one or more conditions to the operator from a direction or apparent direction that is dependent on the location of the one or more conditions relative to the vehicle and corresponding to the one or more displays and/or control inputs.

47. A system for suggesting a course change to an operator of a vehicle in response to one or more external conditions, the vehicle having one or more displays and/or control inputs, said system comprising:

means for receiving one or more messages, wherein the one or more messages includes information regarding the location of the one or more external conditions relative to the vehicle; and means for providing an aural indication to the operator from a direction or apparent direction for a new course for the vehicle to circumvent the one or more external conditions and corresponding to the one or more displays and/or control inputs.

48. A system for informing an operator of a vehicle about one or more conditions, said system comprising:

means for receiving one or more messages, each including information regarding the one or more conditions; and means for displaying the information on one or more displays, each display comprising a scrollable textual messaging area and a selectable graphical display area, and wherein such display area provides a visual indicator describing a direction for an evasive maneuver to avoid the one or more conditions.

49. A system for informing an operator of a vehicle about weather conditions, the vehicle having one or more displays each display comprising a scrollable textual messaging area and a selectable graphical display area, said system comprising:

means for receiving and storing information about weather conditions; and means for displaying the weather conditions on the one or more displays, and wherein such display area provides a visual indicator describing a direction for an evasive maneuver to avoid the weather conditions.

50. A method for alerting an operator of a vehicle about one or more external conditions, said method comprising the steps of:

receiving one or more messages, each including information regarding the one or more external conditions relative to the vehicle; and grouping selected external conditions having a common predetermined similarity into one of two or more categories.

51. The method as recited in claim 50 wherein each of the two or more categories corresponds to one of terrain, traffic, weather, and scheduling constraints.

52. The method of claim 50 further comprising prioritizing the one or more external conditions within each of the one or more categories.

53. The method as recited in claim 52 wherein the one or more external conditions within each of the one or more categories are prioritized as being one of time-critical alerts, tactical alerts, and strategic alerts.

54. The method of claim 53 wherein the time-critical alerts comprise the one or more external conditions having a substantially higher certainty of occurrence and requiring resolution in a substantially shorter period of time.

55. The method of claim 53 wherein the tactical alerts comprise the one or more external conditions having a certainty of occurrence less than that of the time-critical alerts and requiring resolution in a period of time less than that for the time-critical alerts.

56. The method of claim 53 wherein the strategic alerts comprise the one or more external conditions having a certainty of occurrence less than that of the tactical alerts and requiring resolution in a period of time less than that for the tactical alerts.

57. A system for alerting an operator of a vehicle about one or more external conditions, said system comprising:

means for receiving one or more messages, each including information regarding the one or more external conditions relative to the vehicle; and means for grouping selected external conditions having a common predetermined similarity into one of two or more categories.

58. The system as recited in claim 57 further comprising means for prioritizing the one or more external conditions within each of the one or more categories.

* * * * *